US 6,714,878 B2

(12) United States Patent
Vyers

(10) Patent No.: US 6,714,878 B2
(45) Date of Patent: *Mar. 30, 2004

(54) SYSTEM AND METHOD FOR A DIGITAL MASS FLOW CONTROLLER

(75) Inventor: Emmanuel Vyers, Plano, TX (US)

(73) Assignee: Mykrolis Corporation, Billerica, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/062,080

(22) Filed: Jan. 31, 2002

(65) Prior Publication Data
US 2002/0114732 A1 Aug. 22, 2002

Related U.S. Application Data

(63) Continuation of application No. 09/351,120, filed on Jul. 10, 1999.

(51) Int. Cl.[7] .............................. G01F 1/00; G06F 19/00
(52) U.S. Cl. ............................ 702/45; 702/50; 702/100
(58) Field of Search ............................... 702/45, 47–50, 702/100–101, 104; 73/1.16, 1.34, 1.35, 1.59, 23.24–23.27, 23.36; 137/486–487, 487.5

(56) References Cited

U.S. PATENT DOCUMENTS

| 4,632,085 A | 12/1986 | Misawa et al. .............. 123/73 |
| 5,660,207 A | 8/1997 | Mudd .......................... 137/599 |
| 5,765,283 A | 6/1998 | Mudd .......................... 29/890 |
| 5,850,850 A | 12/1998 | Mudd .......................... 137/486 |
| 5,911,238 A * | 6/1999 | Bump et al. ............... 137/487.5 |
| 5,959,203 A * | 9/1999 | Ajjoul ....................... 73/152.51 |
| 6,389,364 B1 * | 5/2002 | Vyers .......................... 702/45 |
| 6,445,980 B1 * | 9/2002 | Vyers .......................... 700/282 |

FOREIGN PATENT DOCUMENTS

DE 30 05 414 A1 8/1981 .......... F02M/65/00

OTHER PUBLICATIONS

LM2674: Simple Switcher Power Converted High Efficiency 500 mA Step–Down Voltage Regulator by National Semiconductor Corporation dated Sep., 1998.
Silicon Processing for the VLSI Era, pp. 165, 166.
International Search Report dated Nov. 7, 2000.

* cited by examiner

Primary Examiner—Bryan Bui
(74) Attorney, Agent, or Firm—Gray Cary Ware & Friedenrich, LLP

(57) ABSTRACT

A method for controlling the gas flow within a digital mass flow controller. The method calculates a digitally enhanced flow rate signal that more accurately represents an actual flow rate through the digital mass flow controller. The digitally enhanced flow rate is calculated using a sensed flow rate signal output from a flow sensor, a scaled first derivative of the sensed flow rate signal, and a scaled, filtered second derivative of the sensed flow rate signal. A set-point signal is compared to the digitally enhanced flow rate signal to generate a digital error signal. The digital error signal is provided to a digitally realized PI (proportional integral) controller. The PI controller generates a digital control signal which is used to control a valve in the digital mass flow controller.

17 Claims, 3 Drawing Sheets

SYSTEM AND METHOD FOR A DIGITAL MASS FLOW CONTROLLER

This is a continuation of application Ser. No. 09/351,120 filed Jul. 10, 1999.

TECHNICAL FIELD OF THE INVENTION

This invention relates generally to a method and system for controlling the flow of gas in a mass flow controller and more specifically to a method and system for generating a digital control signal with a fast response to set point step input in a digital mass flow controller.

BACKGROUND OF THE INVENTION

A mass flow controller (MFC) is a closed loop device that sets, measures, and controls the flow of the mass of a process gas. Semiconductor applications have been and continue to be the driving force behind product development in mass flow controller technology. Nonetheless, mass flow control is useful in other industries such as the pharmaceutical industry and food industry.

A thermal mass flow controller is composed of a front half which includes a flow sensor and a back half which includes a control valve. The flow sensor is often composed of two resistance temperature sensors wound around a capillary tube. When gas flows through the sensor, heat is carried downstream and the temperature difference is proportional to the mass flow rate of the gas. The control valve receives a signal via electronics from the flow sensor to regulate gas flow. Solenoid activated valves are often used as control valves because of their simplicity, quick response, robustness and low cost.

Unfortunately, thermal flow sensors have a slow response time since thermal changes take place over a relatively long period of time. For instance, in FIG. 1, a graphical representation of an actual flow versus time is shown alongside a graphical representation of sensed flow versus time. The y-axis indicates flow rate while the x-axis indicates time. The actual flow is represented as an approximation to a unit step function u(t) where the flow rate reaches a steady state value within a negligible amount of time. $\tau$ is denoted as the time constant it takes for the sensed flow to reach 63% of the actual flow. This may be as much as 1.7 seconds. It takes approximately $5\tau$ to reach at least 99% of the actual flow. Unfortunately, the time delay needed to establish an accurate measurement of the actual flow from the sensed flow can introduce errors in the valve control. Information regarding the flow rate through the control valve is fed back to the control valve. Delay in accurate feedback of this information may contribute to undesirable errors in the flow of gas into a process chamber.

FIG. 2 represents a method used in the prior art to compensate for the time delay in the sensed flow as compared to the actual flow. The actual flow is a unit step function of magnitude $f_o$. FIG. 2 shows a first derivative feedback control loop 10 where a flow sense signal 12 is input into both a first gain stage 14, with gain=1, and a differentiator stage 16. The output of the differentiator 16 is input into a second gain stage 18, with gain=$\tau$. The output of gain stage 14 and gain stage 18 are added to produce output 20 of first derivative feedback control loop 10.

This method approximates flow signal 12 as an exponential signal given by, $$f(t)=f_o(1-e^{t/96}), \quad \text{eqn. 1}$$

where $f_o$ is the final steady state flow rate, t is the time and $\tau$ is the time constant associated with the flow sensor. The output 20 is given by, $$output = f(t) + \tau\frac{df(t)}{dt}. \quad \text{eqn. 2}$$

Inserting eqn. 1 into eqn. 2 yields $$output=f_o u(t). \quad \text{eqn. 3}$$

The output of first derivative feedback control system 10 is a step response of magnitude $f_o$ that is equal to the actual flow $f_o\,u(t)$. Therefore, the actual flow is more closely approximated using first derivative feedback control system 10 than using just sensed flow signal 12.

The prior art method detailed in FIG. 2 has three disadvantages. The first disadvantage is that flow sensors typically do not exhibit linear behavior. Therefore, there is a certain amount of error innate in the flow sensor signal that is input into a control system.

The second disadvantage is that differentiator is typically an analog device. Hardware implementation of a differentiation device is difficult to realize in the analog domain and consequently these methods often use approximate differentiation implemented by linear circuits.

Lastly, first derivative feedback control systems fail to recognize that the flow of gas through the mass flow controller is really not a true first order exponential. Therefore, there is a certain amount of error innate to this type of system.

Ultimately, there is a need for a method that accurately calculates the actual gas flow within a mass flow controller. The method should reduce or eliminate the non-linearities of the flow sensor. This method should also more accurately approximate the flow sense signal which is not a true exponential signal.

SUMMARY OF THE INVENTION

The present invention provides a system and method for controlling gas flow within a digital mass flow controller that substantially eliminates or reduces disadvantages and problems associated with previously developed systems and methods for controlling gas flow within a digital mass flow controller.

The present invention provides a method that calculates a digitally enhanced flow rate signal that more accurately represents an actual flow rate through the digital mass flow controller. The digitally enhanced flow rate signal is calculated using a sensed flow rate signal output from a flow sensor, a scaled first derivative of the sensed flow rate signal, and a scaled second derivative of the sensed flow rate signal. A set-point signal is compared to the digitally enhanced flow rate signal to create a digital error signal. The digital error signal is provided to a digitally realized PI (proportional integral) controller. The PI controller generates a digital control signal that is used to control a valve in the digital mass flow controller.

One advantage of the present invention is that the use of a second derivative enables a more accurate approximation of the sensor signal than the use of a first derivative alone. A more accurate approximation of the sensor flow rate signal enables a more precise and responsive control of the gas flow in a process.

Another advantage of the present invention is that the use of digital signals readily enables interfacing with digital processors such as computers. High speed digital processors can be accessed to aid in rigorous computations, during calibration for example, which may be too lengthy for any on-board DSP controller in the mass flow controller.

BRIEF DESCRIPTION OF THE DRAWINGS

A more complete understanding of the present invention and the advantages thereof may be acquired by referring to the following description, taken in conjunction with the accompanying drawings in which like reference numbers indicate like features and wherein.

DETAILED DESCRIPTION OF THE INVENTION

Preferred embodiments of the present invention are illustrated in the figures, like numerals being used to refer to like and corresponding parts of various drawings.

The present invention provides a method for controlling the gas flow within a digital mass flow controller. The method calculates a digitally enhanced flow rate signal that more accurately represents an actual flow rate through the digital mass flow controller. The digitally enhanced flow rate signal is calculated using a sensed flow rate signal output from a flow sensor, a scaled first derivative of the sensed flow rate signal, and a scaled second derivative of the sensed flow rate signal. A set-point signal is compared to the digitally enhanced flow rate signal to create a digital error signal. The digital error signal is provided to a digitally realized PI (proportional integral) controller. The PI controller generates a digital control signal which is used to control a valve in the digital mass flow controller.

Figure 1:
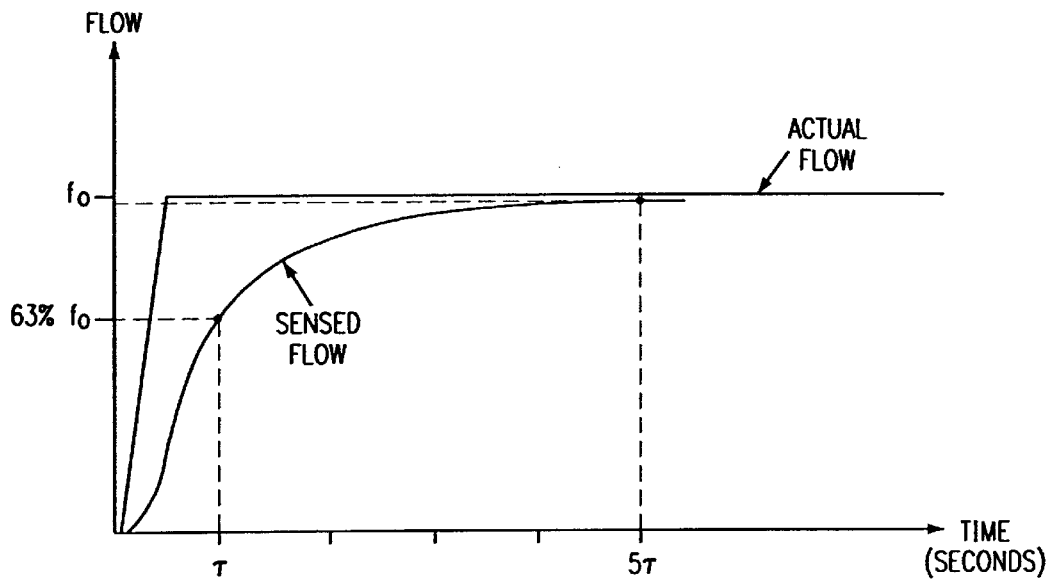
FIG. 1 illustrates the output of a flow sensor in comparison to the actual flow rate in a mass flow controller vs. time.
Figure 2:
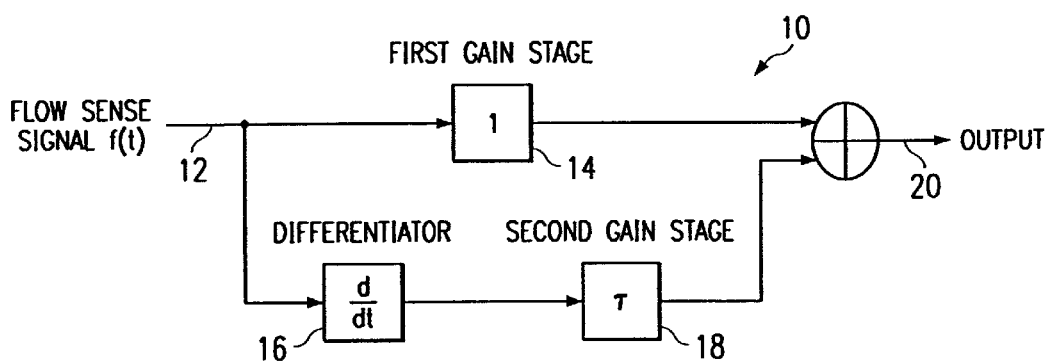
FIG. 2 is a basic control diagram of prior art methods of analog first differentiation and feedback to better approximate the actual flow from the sensed flow.
Figure 3:
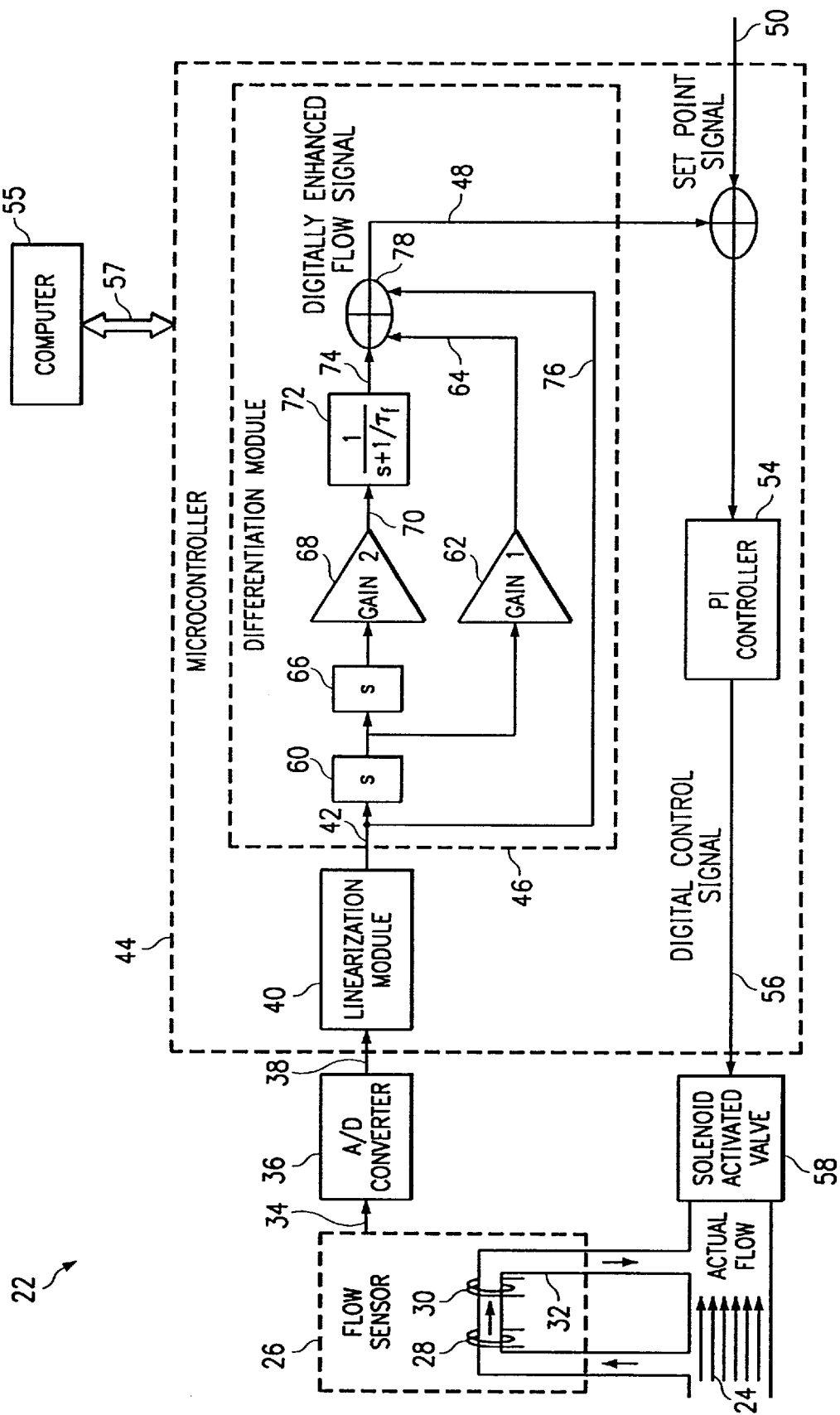
FIG. 3 is one embodiment of the present invention illustrating a system for a digital mass flow controller.

FIG. 3 represents one embodiment of the present invention. In FIG. 3, actual flow 24 in mass flow controller 22 is measured by sensor 26. Sensor 26 may include two resistive wound coils 28 and 30 wrapped around capillary tube 32. Sensor 26 outputs are the sensed flow rate signal 34 which can be input into A-to-D converter 36. The output of the A-to-D converter 36 is digital sensed flow signal 38. Digital sensed flow signal 38 is input into microcontroller 44.

Microcontroller 44 is programmed to perform the computational requirements of the processes represented by linearization module 40, differentiation module 46, and PI controller 54. Microcontroller 44, a digital signal processor (DSP) controller, has software programmed in its on-chip flash program memory array that can be reprogrammed multiple times. The software incorporates all the instruction necessary to the implementation of the functions described within microcontroller 44. The constant coefficients (filter coefficients, linearization coefficients, and various gain factors) are computed in computer 55 and downloaded for microcontroller 44 to use. Linearization module 40 may implement a least squares method to linearize digital flow signal 38. Digital sensed flow signal 38 needs to be linearized since sensor 26 generally produces a sensed flow signal 34 that is a non-linear function of actual flow 24. Linearization module 40 outputs digitally linearized sensed flow signal 42. There are many methods for linearization of the digital sensed flow signal. These methods include least squares methods and other regression techniques known to those skilled in the art. Also included in these linearization methods is the method disclosed in U.S. patent application Ser. No. 09/350,747 filed on Jul. 9, 1999, to T. I. Pattantyus, et al., entitled "System and Method for Sensor Response Linearization". Digitally linearized sensed flow signal 42 can be input into differentiation module 46. Differentiation module 46 creates a digitally enhanced flow rate signal 48. Digitally enhanced flow rate signal 48 more accurately represents actual flow 24 and compensates for the inaccuracies of sensor 26. A detailed description of differentiation module 46 is discussed later in the detailed description.

Digitally enhanced flow rate signal 48 is compared with set-point signal 50. Set-point signal 50, provided by a customer, may be a step input for the desired actual flow 24. Set-point signal 50 may be either an analog signal that is digitized by an embedded A/D converter in microcontroller 44 or it can be a digital signal transmitted to microcontroller 44. An embedded A/D converter in microcontroller 44 allows microcontroller 44 of the present invention to be used as a drop-in replacement in prior art systems. The difference between set-point signal 50 and digitally enhanced flow rate signal 48 is error signal 52. Error signal 52 may be input to PI controller 54 to generate digital control signal 56 that drives solenoid activated valve 58. Solenoid activated valve 58 governs the actual flow 24 in the mass flow controller 22. PI controller 54 may be implemented using the method disclosed in U.S. patent application Ser. No. 09/351,098 filed on Jul. 9, 1999, to E. Vyers, entitled "System and Method for a Variable Gain Proportional-Integral (PI) Controller."

Differentiation module 46 in FIG. 3 represents the process performed by microcontroller 44 using parameters calculated by and downloaded from computer 55 to generate digitally enhanced flow rate signal 48. The block diagram within differentiation module 46 is a continuous-time representation with Laplace transforms representing first differentiation operation 60, second differentiation operation 68, and filter operation 72 having time constant $\lambda_2$. The system, however, is realized digitally. Linearized digital sensor signal 42 is input into first differentiation operation 60 and into first gain stage 62 to output weighted first derivative 64 of linearized digital sensor signal 42. Subsequently, the first derivative of linearized digital sensor signal 42 is input into second differentiation operation 66 and into gain stage 68 to create weighted second derivative 70 of linearized digital sensor signal 42. This weighted second derivative 70 is input into lowpass filter operation 72 to create filtered weighted second derivative 74 of linearized digital sensor signal 42. Weighted first derivative 64 is fed forward to adder 78 and linearized digital sensor signal 42 is fed forward through feed forward loop 76 to adder 78. At adder 78, filtered weighted second derivative 74 of linearized digital sensor signal 42 is combined with weighted first derivative 64 of linearized digital sensor signal 42 and with linearized digital sensor signal 42 to construct digitally enhanced flow rate signal 48. Digitally enhanced flow rate signal 48 more closely represents actual flow 24 in mass flow controller 22 than does sensed flow rate signal 34 obtained from sensor 26.

As stated previously, the operations performed by microcontroller 44, a DSP, are realized digitally. A one-to-one transformation between the analog Laplace representations and their discrete-time counterpart can be easily made. Linear constant coefficient differential equations can be easily transformed to discrete-time linear constant coefficient difference equations. The discrete equivalent of a constant coefficient differential equation, $$\sum_{k=1}^{N} a_k \frac{d^k y(t)}{dt^k} = \sum_{k=1}^{M} b_k \frac{d^k f(t)}{dt^k},\qquad \text{eqn. 4}$$

is $$\sum_{k=1}^{N} a_k y[n-k] = \sum_{k=1}^{M} b_k f[n-k],\qquad \text{eqn. 5}$$

where $a_k$ and $b_k$ are constant coefficients, f(t) is an analog input into the analog system, y(t) is an analog output of the analog system, $$\frac{d^k y(t)}{dt^k}$$

and $$\frac{d^k f(t)}{dt^k}$$

are the $k^{th}$ derivatives of y(t) and f(t), f[n] is a discrete input into the equivalent discrete system, y[n] is a discrete output out of the equivalent discrete system, f[n−k] and y[n−k] are the $k^{th}$ delay values of f[n] and y[n], t is time, and n and k are the integer values representing discrete samples of the discrete functions at a specified sampling interval.

A continuous lowpass filter operation can also be implemented in a discrete mode using difference equations. The analog time domain representation of the Laplace lowpass filter operation 72 is the differential equation, $$f(t) = \frac{dy(t)}{dt} + \frac{1}{\tau_f} y(t) = \sum_{k=0}^{1} \frac{a_k}{b_k} \frac{d y^k(t)}{dt^k},\qquad \text{eqn. 6}$$

where $a_k$ and $b_k$ are constant coefficients, f(t) is an analog input into the filter, y(t) is an analog output of the filter, $$\frac{d^k y(t)}{dt^k}$$

is the $k^{th}$ derivatives of y(t) and $\tau_f$ is the time constant associated with the filter operation. Eqn. 6 can be discretely realized using a difference equation according to eqn. 5. For the sake of simplicity, however, the system has been represented with the various Laplace transforms to illustrate the differentiation and filtering of the linearized digital sensor signal 42.

Figure 4:
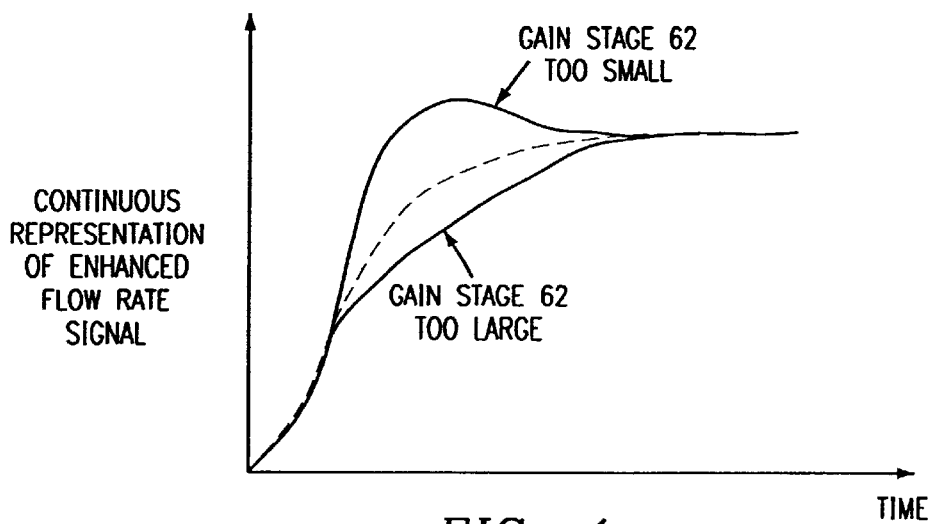
FIG. 4 is a graphical representation of the effects of the first gain stage on a continuous representation of the digitally enhanced flow rate signal.

First gain stage 62 (Gain 1) is designed to cancel the time constant $\tau_1$ associated with sensor 26. First gain stage 62 is adjusted to correct for a sensor response from sensor 26 that takes a long time to settle. FIG. 4 illustrates the effects of varying first gain stage 62 on a continuous representation of digitally enhanced flow rate signal 48. If gain stage 62 is too small, there may be an initial overshoot before the continuous representation of digitally enhanced flow rate signal 48 settles to the steady-state value. If gain stage 62 is too large, there may be an initial undershoot before the continuous representation of digitally enhanced flow rate signal 48 settles to the steady-state value. Due to the variability of the system, first gain stage 62 is uniquely calculated for process gas species and a given mechanical platform. The first gain stage 62 is uniquely determined and is a function of the sensor construction and the process gas. Computational fluid dynamic (CFD) models, empirical testing and mathematical solution have been developed primarily in an effort to minimize the time constant $\tau_1$ of the sensor. The relationship of temperature rise, coil length, gap between coils, tube internal diameter, tube wall thickness, tube thermal conductivity and insulation were analyzed and will be further discussed. Practically speaking, one sensor employed by one embodiment of the present invention displays a 1.7s time constant $\tau_1$. The gas type effect displays a tendency for the sensor time constant $\tau_1$ to increase in proportion to the gas weight (typically 5% at most). The time constant $\tau_1$ is set to a default value (1.7) and fine tuned by observation of the actual response.

Since sensed flow rate signal 34 is not a true exponential signal, first weighted derivative 64 does not completely correct sensed flow rate signal 34 to accurately approximate actual flow 24. To more accurately approximate actual flow 24, a second time constant $\tau_2$ is incorporated in the approximation of sensed flow rate signal 34. Therefore, sensed flow rate signal 34 can be approximated as $$f(t)=(1-e^{-t/\tau_1})(1-e^{-t/\tau_2})\qquad \text{eqn. 7}$$

where t is time, f(t) is sensed flow rate signal 34, $\tau_1$ is a first time constant and $\tau_2$ is a second time constant. Assuming a steady-state step input $f_o$ and according to FIG. 3, digitally enhanced flow rate signal 48 can be represented in the analog domain as $$f(t) + (\text{Gain } 1)\frac{df(t)}{dt} + (\text{Gain } 2)\frac{d^2 f(t)}{dt^2}$$

with Gain $1=\tau_1+\tau_2$ and Gain $2=\tau_1*\tau_2$. The time lags that can contribute to $\tau_1$ and $\tau_2$ are pneumatic lag between sensor 26 and the seat of solenoid-activated valve 58 and to a limited extent the solenoid activating solenoid activated-valve 58 when dealing with hysterisis, friction and line pressure dependent preload forces holding the seat shut of solenoid-activated valve 58.

Figure 5:
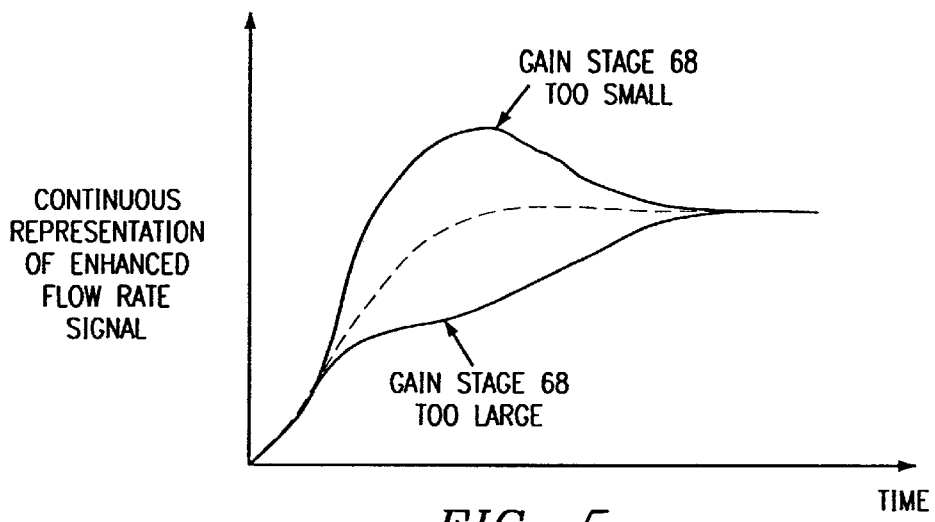
FIG. 5 is a graphical representation of the effects of the second gain stage on a continuous representation of the digitally enhanced flow rate signal.
Figure 6:
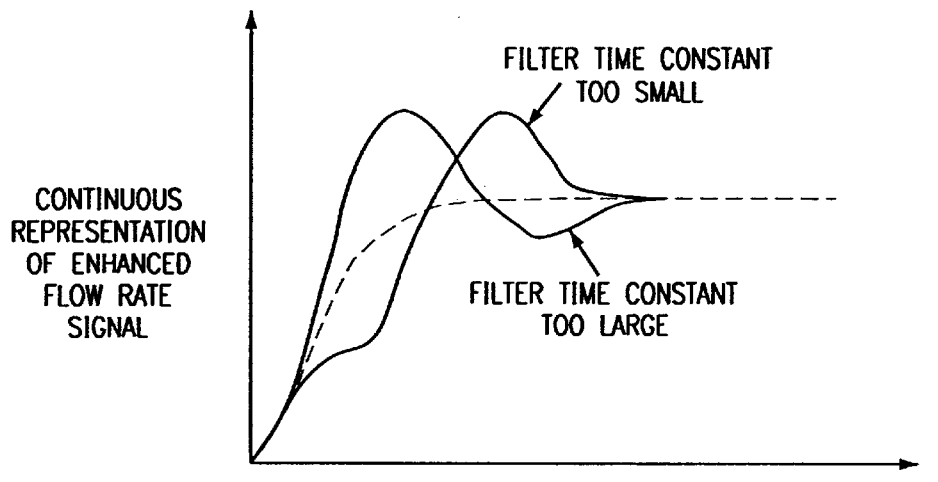
FIG. 6 is a graphical representation of the effects of the filter time constant on a continuous representation of the digitally enhanced flow rate signal.

Therefore, second derivative operation 66 is implemented with the corresponding second gain stage 68 (Gain 2). Second derivative operation 66 corrects for the front end of the sensed flow rate signal 34 which does not accurately approximate a true exponential rise. As with first gain stage 62, second gain stage 68 is adjustable by programming. FIG. 5 illustrates the effects of varying second gain stage 68 on a continuous representation of digitally enhanced flow rate signal 48. If second gain stage 68 is small, there may be an initial overshoot before the continuous representation of digitally enhanced flow rate signal 48 settles to the steady-state value, while if second gain stage 68 is large, there may be an initial undershoot of the signal before the continuous representation of digitally enhanced flow rate signal 48 settles to the steady-state value. Thus, second gain stage 68 can be properly calibrated to minimize or eliminate overshoot or undershoot. Second gain stage 68 is also adjusted by observation as described above.

Lowpass filter operation 72 is implemented to reduce the noise generated in digitally enhanced flow rate signal 48 when implementing second differentiation operation 66. Lowpass filter operation 72 has associated time constant $\tau_f$. By adjusting time constant $\tau_f$, the response of lowpass filter operation 72 can be over-corrected or under-corrected. FIG.

6 illustrates the effects of varying time constant $\lambda_f$ on a continuous representation of digitally enhanced flow rate signal 48. For large filter time constant $\lambda_f$, the filter response may be too slow, while for a small filter time constant $\lambda_f$, the filter response may be too fast. The filter time constant $\lambda_f$ is chosen to adjust the speed of signal 48.

The system in FIG. 3 may also use a computer 55 to perform rigorous computations that require more speed and power than that available in microcontroller 44 during calibration and test. Computational results can be downloaded from computer 55 to microcontroller 44 via electrical communication connection 57, such as a bus or cable.

Overall, the system of FIG. 3 may be realized easily by implementing a thermal flow sensor with conditioning circuitry with ~1.7 second primary time constant. Reference is made to the flow sensor circuitry disclosed in U.S. patent application Ser. No. 09/350,746 filed Jul. 9, 1999 by T. I. Pattantyus et. al., entitled "Improved Mass Flow Sensor Interface Circuit." A 16-bit-accuracy A/D converter with a sampling rate of 610 Hz, a 16-bit digital signal processor microcontroller, a PC, and pulse width modulated or continuous valve drive circuitry which controls the a solenoid-activated, low power, throttling ball/seat valve can also be included. Many circuit configurations can be implemented for the valve drive circuitry. Reference is made to the circuitry disclosed in U.S. patent application Ser. No. 09/351,111 filed on Jul. 10, 1999, to T. I. Pattantyus, entitled "Method and System for Driving a Solenoid"

Mass flow controllers can implement a closed loop control algorithm. Reference is made to the advanced digital control algorithm disclosed in U.S. patent application Ser. No. 09/350,744 filed on Jul. 9, 1999 by K. Tinsley entitled "System and Method of Operation of a Digital Mass Flow Controller".

A major technical advantage of the present invention is that it is realized in the discrete-time domain. Rigorous mathematical computations can be performed or aided by computer 55. Although some prior art methods implement discrete controllers, these methods typically do not possess digital platforms with the power to generate the mathematics which include both a first and a second derivative. Consequently, these methods are limited to digital implementations of the first derivative. Through the use of a powerful computer 55, however, the present invention is able to perform rigorous mathematical computations. Parameter calculations such as first gain stage 62, second gain stage 68, and time constant $\lambda_f$ can be worked out on computer 55 and then downloaded into an erasable memory array such as an EEPROM in microcontroller 44. Microcontroller 44 then can access these values from the EEFROM when calculating digitally enhanced flow rate signal 48.

Another important technical advantage of the present invention is that with the implementation of second differentiation operation 66, digitally enhanced flow rate signal 48 closely approximates actual flow 24. Since sensed flow rate signal 34 is not a pure exponential signal, implementation of the first differentiation operation 60 alone does not sufficiently approximate actual flow 24. Weighted first derivative 64 and weighted second derivative 70 accelerate the response of the sensed flow rate signal 34 to more closely approximate actual flow 24. Subsequent filtering of weighted second derivative 70 reduces noise associated with implementing second differentiation operation 66.

Still yet another technical advantage of the present invention is that through the use embedded A/D converters in microcontroller 44, microcontroller 44 can easily replace prior art systems used to control gas in a manufacturing process. These processes, which may have used analog methods and continuous set-point voltage inputs to control the gas flow, can still use microcontroller 44. The analog signals, such as sensed flow rate signal 34 and set-point signal 50, are digitized and then used for computations in microcontroller unit 44.

Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. It is contemplated that all such changes and additional embodiments are within the spirit and true scope of this invention as claimed below.

What is claimed is:

1. A digital mass flow controller for controlling the flow of gas in a process, said digital mass flow controller comprising:

a flow sensor that measures an actual gas flow rate through said digital mass flow controller and outputs a sensed flow rate signal;

a digital microcontroller which generates a digital control signal using said sensed flow rate signal, a first derivative of said sensed flow rate signal, a filtered second derivative of said sensed flow rate signal, and a set-point signal; and a valve in said digital mass flow controller which is controlled by said digital control signal.

2. The system of claim 1, wherein said microcontroller is executable to:

generate a weighted first derivative of said sensed flow rate signal;

generate a weighted second derivative of said sensed flow rate signal;

filter said weighted second derivative to generate a filtered weighted second derivative; and sum said sensed flow rate signal with said weighted first derivative signal and said filtered weighted second derivative signal to generate a digitally enhanced flow rate signal.

3. The system of claim 2, wherein said digital mass flow controller further comprises an A-to-D converter operable to:

convert said sensed flow rate to a digital sensed flow rate signal; and communicate said digital sensed flow rate signal to said microcontroller as said sensed flow rate signal.

4. The system of claim 3, wherein said digital sensed flow rate signal is converted to a digitally linearized sensed flow rate signal using a least squares method prior to:

calculating said first derivative;

calculating said second derivative; and summing said digital sensed flow rate signal with said weighted first derivative signal and said weighted second derivative signal.

5. The system of claim 2, wherein said first weight is calculated based on gas species in said digital mass flow controller and a given mechanical platform.

6. The system of claim 2, wherein said second weight is calculated to correct where said digitally linearized sensed flow rate signal does not approximate a true exponential rise.

7. The system of claim 6, wherein said microcontroller is further executable to filter said weighted second derivative to generate a filtered weighted second derivative by implementing a digital lowpass filter operation that further comprises a time constant which is determined empirically.

8. The system of claim 7, wherein said digital microcontroller is further executable to:
compare said set-point signal with said digitally enhanced flow rate signal to generate a digital error signal; and
implement a digital PI (proportional integral) control operation on said digital error signal to generate a digital control signal.

9. A The system of claim 8, wherein said set-point signal is a digital signal.

10. The system of claim 8, wherein said set-point signal is converted to a digital set-point signal prior to comparing said set-point signal with said digitally enhanced flow rate signal.

11. The system of claim 10, wherein said digital microcontroller is a digital signal processor microcontroller.

12. The system of claim 11, wherein said digital signal processor microcontroller is executable to communicate with a computer via a connection between said computer and said digital signal processor controller, said computer is executable to perform calculations including said first weight, said second weight, and said time constant.

13. The system of claim 12, wherein said computer is further executable to download said calculations performed by said computer to a storage device in said digital signal processor controller to aid said digital signal processor controller in calculating said digital control signal.

14. The system of claim 13, wherein said storage device is an EEPROM.

15. The system of claim 2, wherein said weighted first derivative, said weighted second derivative, said filtered weighted second derivative, and said digital control signal are calculated using difference equations.

16. A method for controlling a gas flow comprising:
generating a sensed flow rate signal based on a measured gas flow rate;
generating a digital control signal based on said sensed flow rate signal, a first derivative of said sensed flow rate signal, a filtered second derivative of said sensed flow rate signal, and a set-point signal; and
regulating flow through a valve based on said digital control signal.

17. The method of claim 16, wherein the step of generating said digital control signal further comprises:
generating a digitally enhanced flow rate signal representing a final state—state flow rate, said step of generating a digitally enhanced flow rate signal further comprising:
weighting said first derivative of said sensed flow rate signal to generate a weighted first derivative said sensed flow rate signal;
weighting said second derivative of said sensed flow rate signal to generate a weighted second derivative of said sensed flow rate signal;
filtering said weighted second derivative of said sensed flow rate signal to generate a filtered weighted second derivative of said sensed flow rate signal; and
summing said sensed flow rate signal with said weighted first derivative and said filtered weighted second derivative signal to generate said digitally enhanced flow rate signal;
comparing said set-point signal with said digitally enhanced flow rate signal to generate a digital feedback error signal; and
generating said digital control signal by inputting said digital feedback error signal into a proportional integral controller and outputting from said proportional integral controller said digital control signal.

* * * * *

UNITED STATES PATENT AND TRADEMARK OFFICE
CERTIFICATE OF CORRECTION

PATENT NO.    : 6,714,878 B2
DATED         : March 30, 2004
INVENTOR(S)   : Emmanuel Vyers It is certified that error appears in the above-identified patent and that said Letters Patent is hereby corrected as shown below:

Title page,
Item [74], *Attorney, Agent or Firm*, delete "Friedenrich" and insert -- Freidenrich --

Signed and Sealed this

Thirteenth Day of July, 2004

JON W. DUDAS
*Acting Director of the United States Patent and Trademark Office*